(12) United States Patent
Lang et al.

(10) Patent No.: US 8,104,965 B2
(45) Date of Patent: Jan. 31, 2012

(54) AXLE STUB BEARING UNIT

(75) Inventors: Johannes Lang, Oberreichenbach (DE); Michael Ruprich, Biebertal (DE); Thomas Schilling, Herzogenaurach (DE)

(73) Assignee: Schaeffler Technologies GmbH & Co. KG, Herzogenaurach (DE)

( * ) Notice: Subject to any disclaimer, the term of this patent is extended or adjusted under 35 U.S.C. 154(b) by 834 days.

(21) Appl. No.: 12/093,347

(22) PCT Filed: Nov. 7, 2006

(86) PCT No.: PCT/EP2006/068160
§ 371 (c)(1),
(2), (4) Date: Jul. 1, 2008

(87) PCT Pub. No.: WO2007/054486
PCT Pub. Date: May 18, 2007

(65) Prior Publication Data
US 2008/0315545 A1    Dec. 25, 2008

(30) Foreign Application Priority Data
Nov. 12, 2005 (DE) .......... 10 2005 054 114

(51) Int. Cl.
*F16C 21/00* (2006.01)
(52) U.S. Cl. ...................... 384/127; 384/569

(58) Field of Classification Search ............... 384/126, 384/127, 420, 448, 463, 548, 559, 569
See application file for complete search history.

(56) References Cited

U.S. PATENT DOCUMENTS

| | | | | |
|---|---|---|---|---|
| 1,666,368 A | * | 4/1928 | Cook | 384/127 |
| 2,069,569 A | * | 2/1937 | Young | 384/564 |
| 3,580,170 A | * | 5/1971 | Furman | 384/127 |
| 4,492,415 A | * | 1/1985 | Baile et al. | 384/463 |
| 4,995,736 A | * | 2/1991 | Haase et al. | 384/448 |
| 5,184,402 A | * | 2/1993 | Kadokawa | 29/898.07 |
| 5,615,956 A | * | 4/1997 | Oba et al. | 384/470 |
| 5,865,678 A | * | 2/1999 | Koedam et al. | 384/127 |

FOREIGN PATENT DOCUMENTS

| | | |
|---|---|---|
| DE | 19738113 | 3/1999 |
| DE | 19958180 | 6/2001 |
| DE | 10150228 | 5/2003 |
| EP | 1038755 | 9/2000 |
| EP | 1522485 | 4/2005 |
| WO | 9845157 | 10/1998 |

* cited by examiner

Primary Examiner — Thomas R Hannon
(74) Attorney, Agent, or Firm — Volpe and Koenig, P.C.

(57) ABSTRACT

An axle stub bearing unit for a bearing point of an axle stub of a steerable axle of a vehicle is provided, with a radial bearing that is constructed as a needle bearing, and a separate axial bearing that is constructed as a sliding bearing, which are accommodated in a cup-shaped bush (2, 12, 21, 25). The bush is a component which is formed in one piece and is provided with a sleeve (7, 14, 19, 26) in a region of the axial bearing.

17 Claims, 4 Drawing Sheets

AXLE STUB BEARING UNIT

BACKGROUND

The invention relates to an axle stub bearing unit for a bearing point of an axle stub of a steerable axle of a vehicle, with a radial bearing, which is constructed as a needle bearing, and a separate axial bearing, which is constructed as a sliding bearing, wherein these bearings are accommodated in a cup-shaped bush.

Axle stub bearing units are used in steerable front axles of commercial vehicles and buses. So that these vehicles can be steered, the wheels or wheel heads of at least one vehicle axle must be supported so that they can rotate about an axle stub pin. The axle stub is connected to the vehicle by the vehicle axle. In the axle stub, the axle stub pin is installed protected from torsion. The wheel head and the wheel are supported by an upper and lower bearing so that they can rotate about the axle stub pin. Both axle stub bearings with separate radial and axial bearings and also combined radial-axial bearings are known. The upper and lower radial bearings can be constructed as sliding bearings, but typically as needle bearings. The radial bearing receives radial forces generated, e.g., when driving in a curve. The lower axial bearing can be constructed, e.g., as sliding bearings and receives the weight forces of the vehicle or forces generated during driving. The upper axial bearing, which can be constructed as a sliding bearing with a thrust washer, receives axial forces generated during driving, for example, when the vehicle is driving over uneven ground, a pothole, or a curb.

From DE 197 38 113 A1, a front axle for a truck or minivan with steerable, non-driven wheels is provided. There, in FIG. 2 an axle stub bearing unit is shown, in which, instead of cylinder or tapered rollers, a sliding bearing is provided, which comprises a pressure ring that is supported on a bearing ring washer in a sliding manner. This conventional axle stub bearing unit, however, has the disadvantage that it has a relatively complicated construction. For sealing the axial bearing, a sliding sleeve is provided there, which requires increased structural effort. In addition, the pressure ring is a solid component, which requires a large installation space and leads to relatively high costs.

SUMMARY

The invention is based on the objective of providing an axle stub bearing unit, which is easier to produce and guarantees a long service life. In addition, a reduction of the required installation space is desired.

To meet this objective, for an axle stub bearing unit of the type noted above, it is provided according to the invention that the bush is a one-piece, formed component provided with a sleeve in the region of the axial bearing.

The axle stub bearing unit can be produced economically, because cutting, mechanical post-processing of the bush is no longer necessary. Through the simple construction, the installation space required for the axial bearing of the axle stub bearing unit will be reduced. The axle stub bearing unit according to the invention is produced as a ready-to-install, completely assembled unit, which can be mounted in a very easy manner.

In order to protect the axle stub bearing unit according to the invention, in particular, its axial bearing, from water penetration, corrosion, and contaminant particles, a seal can be arranged between the bush and the sleeve. This seal is pressed into the axle stub bearing unit and the seal integrated in this way forms a type of labyrinth, which is used simultaneously as a reservoir for a lubricant.

The axle stub bearing unit according to the invention can have a maintenance-free design, in this case, for production it is filled with a lubricant, such as grease, which guarantees lubrication for the entire service life. Alternatively, the axle stub bearing unit according to the invention can also have a maintenance-requiring construction, in that a lubricating nipple is arranged in the base of the bush.

So that the base of the bush withstands the resulting pressure due to the lubricant pressure, it can be provided that the base of the bush is convex. In other constructions with a flat base, the base should be supported by components bordering the base on the outside.

The axle stub bearing unit according to the invention can have an anti-corrosion coating or can be made from a rust-proof material, such as stainless steel.

The sliding bearing of the axle stub bearing unit according to the invention can have a sliding washer, in particular, a high wear-resistant plastic sliding washer. Such materials exhibit only minimal wear and are therefore practically maintenance-free. According to a preferred embodiment, a sealing element can be provided, which seals the sliding washer relative to the axle stub pin. Advantageously, the sealing element is constructed as an O-ring and is arranged on the inside of the sliding washer.

In order to achieve a better distribution of the lubricant, the sliding washer of the axle stub bearing unit can have grooves or channels on one or both sides.

The bush of the axle stub bearing unit according to the invention can have an increased diameter in the region of the axial bearing for receiving the sliding washer. For this purpose, the bush can be formed accordingly on its open end. The diameter increase is dependent on the force that must be transmitted by the axle stub bearing unit.

It is preferred that the sliding washer is made from a plastic material with sliding particles, advantageously from polyamide with embedded PTFE (polytetrafluoroethylene). However, other materials can also be used for the sliding washer, if these are wear-resistant.

The radial bearing of the axle stub bearing unit can be constructed as a needle bearing, wherein the needles are either accommodated in a cage or held by grease in a fully rolling construction. In the fully rolling construction, a packaging sleeve pushed into the bush of the axle stub bearing unit can be provided, which is removed for mounting.

In order to prevent the penetration of dirt into the axle stub bearing unit, according to an advantageous construction it can be provided that a ring-shaped sealing element is arranged on the outer diameter of the sleeve. Advantageously, the sealing element has a sealing lip pointing outwardly in the radial direction. In the installed state, this sealing lip contacts a rigid axle body, so that the axle stub bearing unit is sealed by the sealing lip.

According to an improvement of the invention, it can be provided that the sealing element has a two-part construction and an inner ring mounted on the sleeve and an outer ring, which features the sealing lip and which can be displaced in the axial direction relative to the inner ring. The outer ring can be locked in at least two positions that are spaced apart in the axial direction. Accordingly, after assembly the outer ring is pushed on the inner ring in the axial direction and forms an additional seal by its sealing lip. Here it can be provided that the outer ring or the inner ring has an advantageously ring-shaped projection, which can engage in a complementary recess, preferably a groove, of the other ring for locking.

An especially good sealing effect and a long service life can be achieved if the sealing lip, optionally also the inner ring, is or are made from an elastomer.

In an alternative construction of the axle stub bearing unit according to the invention, it can be provided that the sleeve, on its inner diameter, has a formed or flattened axial section, which is pressed onto the axle stub pin in the installed state. In this construction, instead of the sliding washer, the flattened section contacts the axle stub pin.

Also lying within the scope of the invention is that the bush of the axle stub bearing unit according to the invention is open in the base region and can be closed by a separate cover. Then the packaging sleeve is pressed outward through the open base region during mounting of the bush. The cover can have a lubricating nipple.

Another alternative of the axle stub bearing unit according to the invention provides that the sliding bearing is divided, comprising a thrust washer supported on the bush in the axial direction and a sliding washer contacting the thrust washer and supported on the sleeve in the axial direction. The division produces considerable material savings of sliding material, which is relatively expensive. The thrust washer can be made from a metal material, in particular, from steel. The sliding washer is made advantageously from a plastic material with sliding particles, alternatively from steel with a coating.

The needle bearing can have a single-row or double-row construction in the form according to the invention. It is also possible to provide a separate, second radial bearing, by which in many cases the assembly is simplified.

BRIEF DESCRIPTION OF THE DRAWINGS

Additional advantages and details of the invention result from the following description of embodiments. Shown are.

DETAILED DESCRIPTION OF THE PREFERRED EMBODIMENTS

Figure 1A:
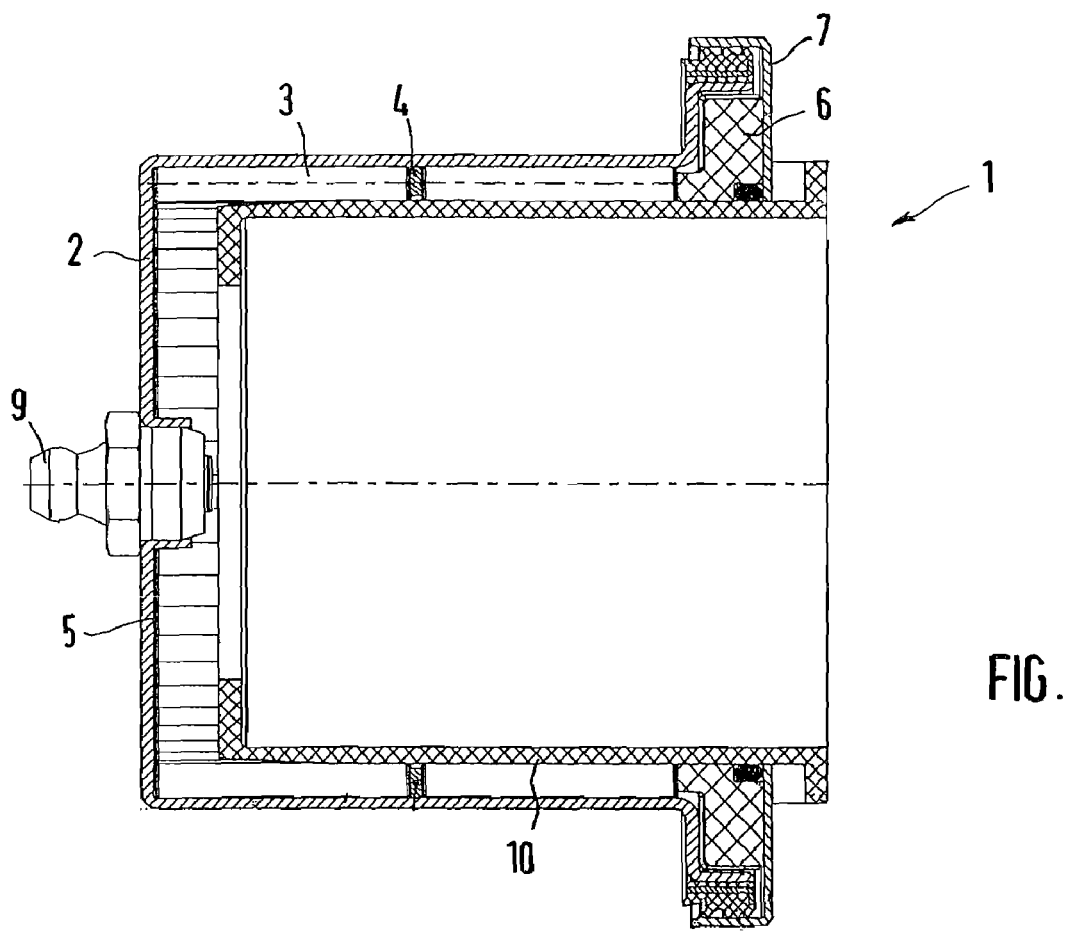
FIGS. 1A and 1B views of a first embodiment of the invention.
Figure 1B:
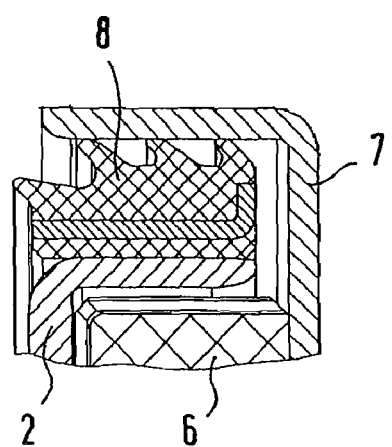

FIG. 1A shows an axle stub bearing unit 1 for a bearing point of an axle stub of a steerable axle of a vehicle. In the bush 2, roller bodies constructed as needles 3 are arranged in two rows, which form a radial bearing. The needles 3 are supported in the axial direction on a washer 4, which is arranged between the two rows of needles 3, and the other side of the needles 3 contacts, in the axial direction, the base 5 of the bush 2 or a sliding washer 6. The sliding washer 6 is accommodated in a sleeve 7. The bush 2 is constructed as a formed part and has an increased diameter for accommodating the sliding washer 6 on its open side. The sliding washer 6 connected to the sleeve 7 can rotate relative to the bush 2. On the inside of the sliding washer 6 there is a sealing element constructed as an O-ring. A multiple-lip seal 8 pressed between the sleeve 7 and the bush 2 prevents the penetration of dirt into the interior of the bush 2, as can be seen from FIG. 1B, which shows an enlarged cut out in the region of the seal.

The base 5 is provided with a lubricating nipple 9, in order to supply the axle stub bearing unit 1 with new grease in the scope of maintenance at certain intervals.

The axle stub bearing unit 1 shown in FIG. 1A involves a fully rolling version, in which there is no cage for the roller body, instead, the needles are held by grease. To secure the needles 3 for assembly, a packaging sleeve 10 is provided, which is pushed into the bush 2 and is removed directly before assembly.

Figure 2A:
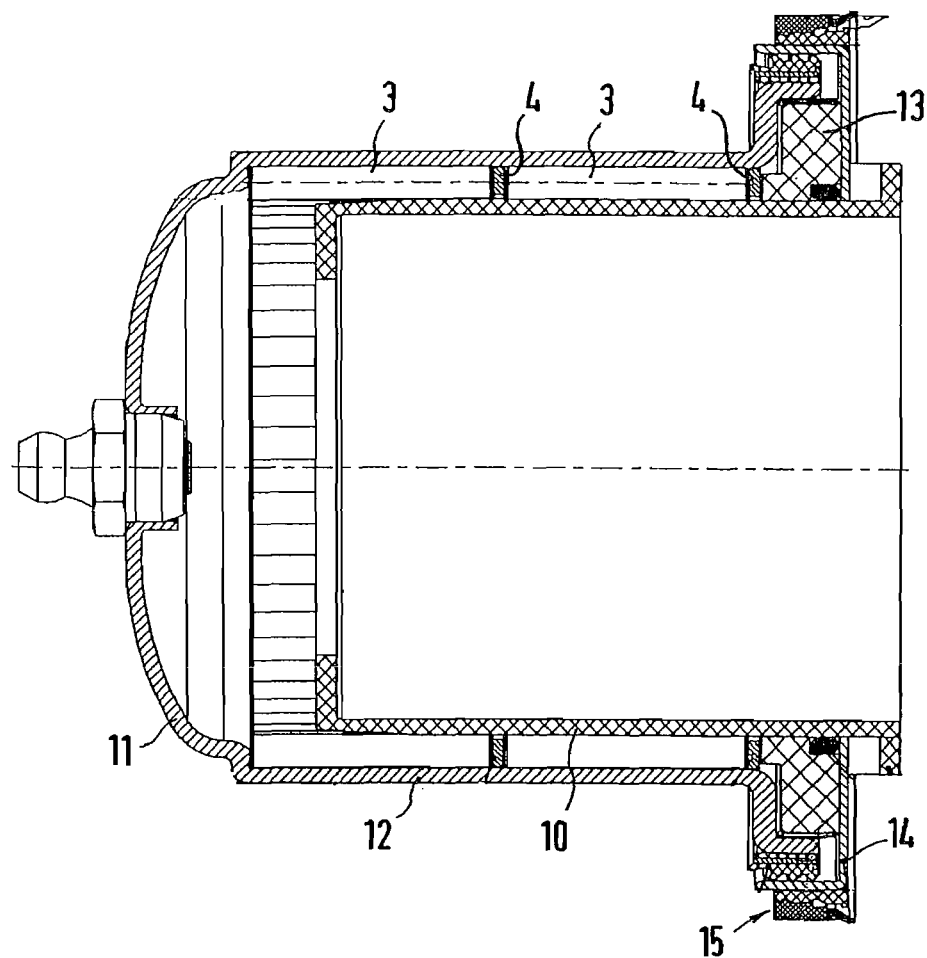
FIGS. 2A and 2B views of a second embodiment of the invention.
Figure 2B:
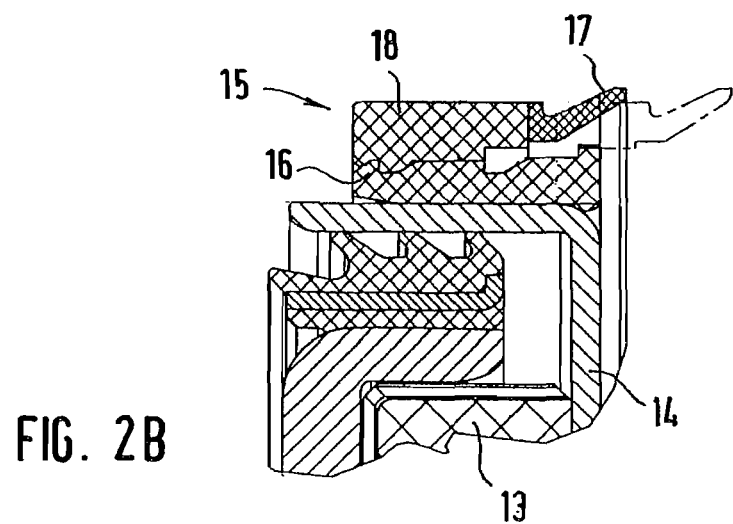

FIGS. 2A and 2B show a second embodiment of the invention, in which the base 11 of the bush 12 has a curved construction, in order to be able to receive the pressure generated when the grease is pressed in during lubrication.

Between the needles 3 and the sliding washer 13 there is an additional washer 4.

On the sleeve 14 there is a ring-shaped sealing element 15, which is constructed as a protective cap and which is shown in the enlarged illustration of FIG. 2B and which has a two-part construction with an inner ring 16 mounted on the sleeve 14 and an outer ring 18 with a sealing lip 17.

As to be best seen in FIG. 2B, the inner ring 16 has two peripheral grooves spaced apart in the axial direction, in which a projection of the outer ring 18 engages. Accordingly, after assembly the outer ring 18 can be pushed in the axial direction relative to the inner ring 16, so that an additional seal of the axle stub bearing unit is produced by the sealing lip 17. This position is shown with dashed lines in FIG. 2B.

Figure 3A:
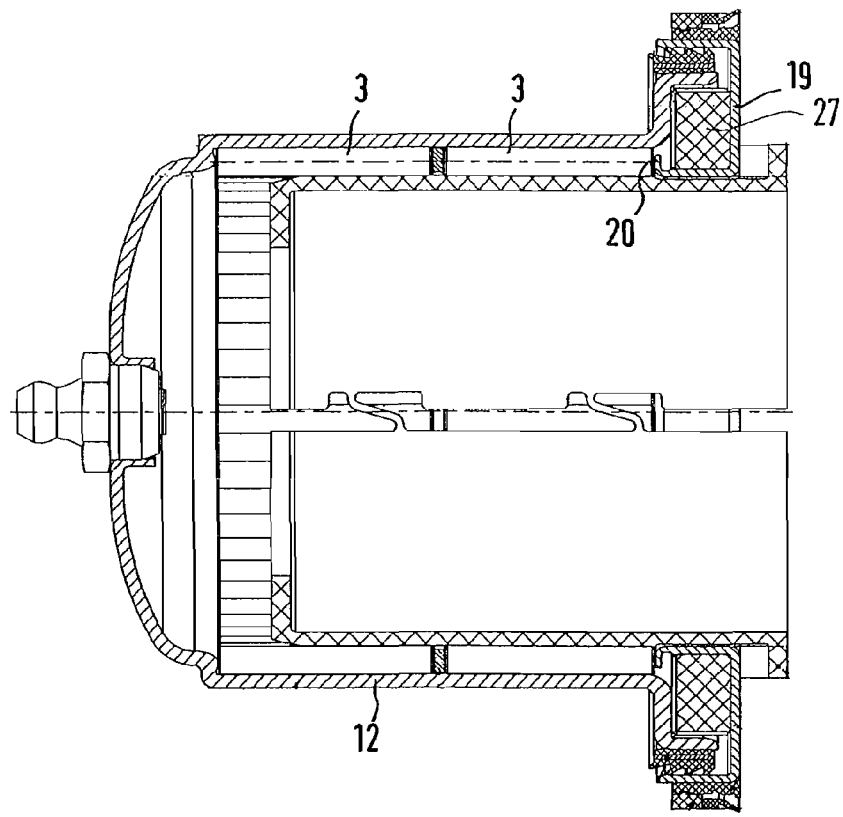
FIGS. 3A and 3B views of a third embodiment of the invention.
Figure 3B:
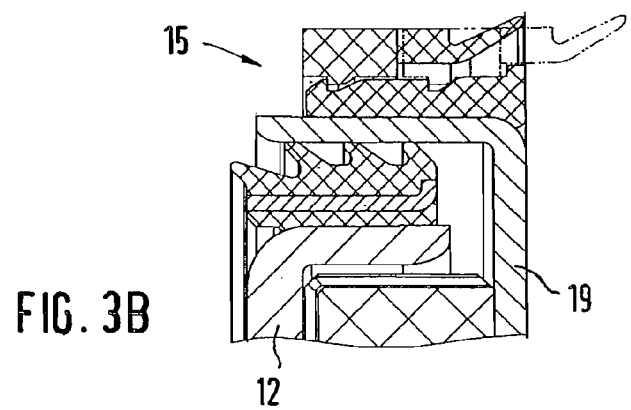

FIGS. 3A and 3B show a third embodiment of the invention.

In keeping with the second embodiment, the sleeve 19 shown in FIG. 3A has the two-part sealing element 15 on the outside. However, the sleeve 19, in which a sliding washer 27 is arranged, is bent twice or flattened on its inner diameter, as shown in FIG. 3B, so that, after installation, the sleeve 19 is pressed directly onto the axle stub pin. The seal with the axle stub pin is here achieved by a press fit between the axle stub pin and the sleeve 19. The needles 3 contact the flattened section 20 of the sleeve 19 in the axial direction.

Figure 4:
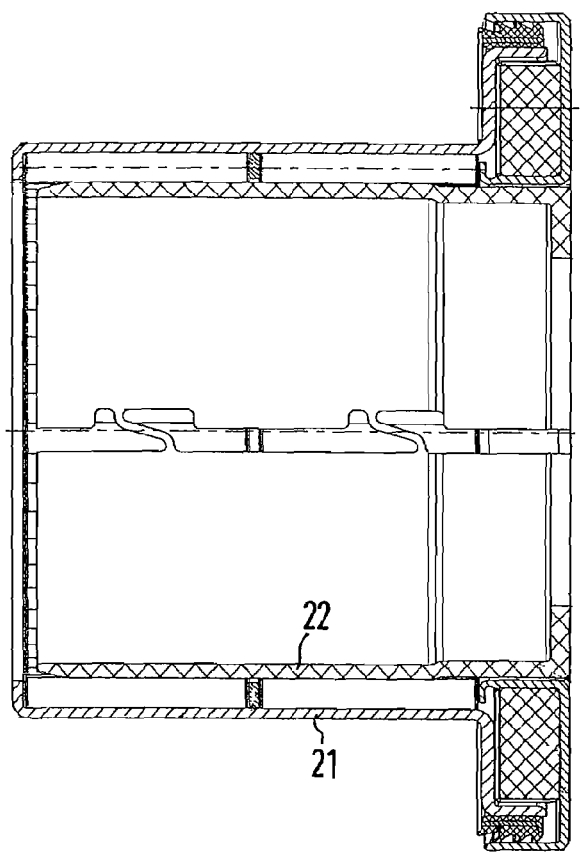
FIG. 4 views of a fourth embodiment of the invention.

FIG. 4 shows a fourth embodiment of the invention.

The bush 21 is open in the base region and can be closed by a separate cover not shown in FIG. 4. During the assembly of the axle stub pin, the packaging sleeve 22 can be pushed out of the bush 21 in the axial direction, toward the left in the view from FIG. 4.

Figure 5:
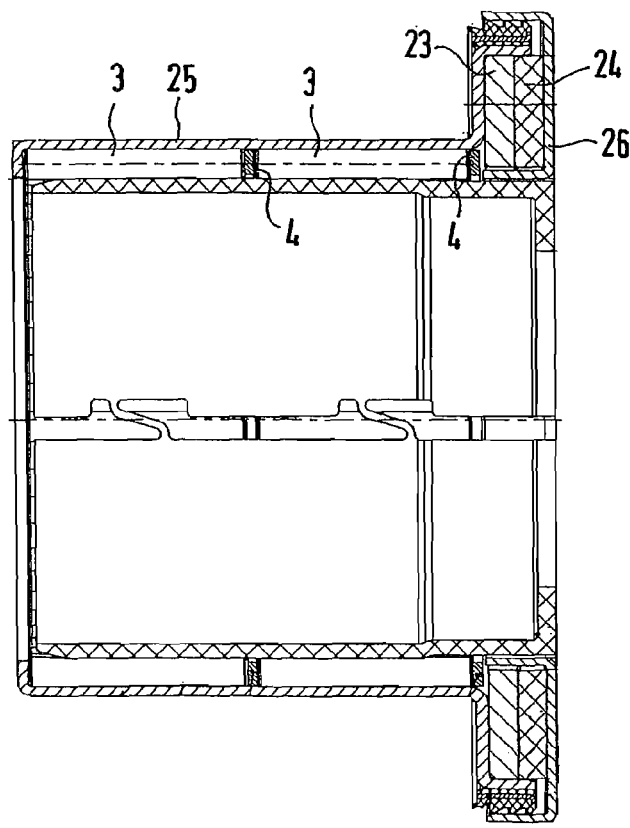
FIG. 5 views of a fifth embodiment of the invention.

FIG. 5 shows a fifth embodiment of the invention, in which the sliding bearing is divided and comprises a thrust washer 23 and a sliding washer 24. The thrust washer 23 is supported on the bush 25 in the region of its enlarged diameter. The thrust washer 23 is made from steel and is used as a fixed supporting or spacing washer. The sliding washer 24 contacts the thrust washer 23, can move relative to it, and is made from a sliding material. As the sliding material, a plastic material is used, which has sliding particles. The sliding washer 24 is supported in the axial direction on the sleeve 26 and the thrust washer 23. Another washer 4, on which the needles 3 contact, is arranged between the needles 3 and the thrust washer 23. In other constructions, the sliding washer 24 can be made from steel or a non-ferrous metal and can have a sliding coating. The sliding contact is here achieved by special sliding layers or coatings, which are applied to a carrier material. The sliding coatings distinguish themselves through high wear resistance and abrasion resistance.

The different variants shown in FIGS. 1 to 5 can be combined with each other arbitrarily.

REFERENCE NUMBERS

1 Axle stub bearing unit
2 Bush
3 Needle

4 Washer
5 Base
6 Sliding washer
7 Sleeve
8 Multiple-lip seal
9 Lubricating nipple
10 Packaging sleeve
11 Base
12 Bush
13 Sliding washer
14 Sleeve
15 Sealing element
16 Inner ring
17 Sealing lip
18 Outer ring
19 Sleeve
20 Flattened section
21 Bush
22 Packaging sleeve
23 Thrust washer
24 Sliding washer
25 Bush
26 Sleeve
27 Sliding washer

The invention claimed is:

1. Axle stub bearing unit for a bearing point of an axle stub of a steerable axle of a vehicle, comprising a radial bearing constructed as a needle bearing and a separate axial bearing constructed as a sliding bearing, wherein the bearings are accommodated in a cup-shaped bush, the bush is a one-part, formed component and a sleeve is located on the bush in a region of the axial bearing, and a seal is arranged between the bush and the sleeve.

2. Axle stub bearing unit according to claim 1, wherein the bush includes a base and a lubricating nipple is arranged in the base of the bush.

3. Axle stub bearing unit according to claim 2, wherein the base of the bush has a convex, curved construction.

4. Axle stub bearing unit according to claim 1, wherein the needles of the radial bearing are held by grease in the radial bearing.

5. Axle stub bearing unit according to claim 4, wherein the needles are held by a packaging sleeve which can be removed during assembly of the axle stub bearing unit and which is pushed into the bush.

6. Axle stub bearing unit according to claim 1, wherein the needle bearing has a double-row construction.

7. Axle stub bearing unit for a bearing point of an axle stub of a steerable axle of a vehicle, comprising a radial bearing constructed as a needle bearing and a separate axial bearing constructed as a sliding bearing, wherein the bearings are accommodated in a cup-shaped bush, the bush is a one-part, formed component and a sleeve is located on the bush in a region of the axial bearing, and the sliding bearing has a sliding washer, which has a sealing element that seals the sliding washer in an installed state relative to an axle stub pin.

8. Axle stub bearing unit according to claim 7, wherein the bush has an enlarged diameter for accommodating the sliding washer in a region of the axial bearing.

9. Axle stub bearing unit according to claim 7, wherein the sliding washer is made from a sliding material or includes a sliding layer made from plastic material with sliding particles.

10. Axle stub bearing unit for a bearing point of an axle stub of a steerable axle of a vehicle, comprising a radial bearing constructed as a needle bearing and a separate axial bearing constructed as a sliding bearing, wherein the bearings are accommodated in a cup-shaped bush, the bush is a one-part, formed component and a sleeve is located on the bush in a region of the axial bearing, and a ring-shaped sealing element, which has a sealing lip that extends outwardly in a radial direction, is arranged on an outer diameter of the sleeve.

11. Axle stub bearing unit according to claim 10, wherein the sealing element has a two-part construction with an inner ring mounted on the sleeve and an outer ring, which has the sealing lip and which can be displaced in the axial direction relative to the inner ring.

12. Axle stub bearing unit according to claim 11, wherein the outer ring can be locked at least in two positions that are spaced apart in the axial direction.

13. Axle stub bearing unit according to claim 12, wherein one of the outer ring or the inner ring has a ring-shaped projection, which can engage for locking in a corresponding complementary recess of the other of the inner ring and the outer ring.

14. Axle stub bearing unit according to claim 10, wherein the sealing lip is made from an elastomer.

15. Axle stub bearing unit for a bearing point of an axle stub of a steerable axle of a vehicle, comprising a radial bearing constructed as a needle bearing and a separate axial bearing constructed as a sliding bearing, wherein the bearings are accommodated in a cup-shaped bush, the bush is a one-part, formed component and a sleeve is located on the bush in a region of the axial bearing, and the sleeve has a flattened axial section on an inner diameter, which is pressed on the axle stub pin in an installed state.

16. Axle stub bearing unit for a bearing point of an axle stub of a steerable axle of a vehicle, comprising a radial bearing constructed as a needle bearing and a separate axial bearing constructed as a sliding bearing, wherein the bearings are accommodated in a cup-shaped bush, the bush is a one-part, formed component and a sleeve is located on the bush in a region of the axial bearing, and the bush is open in a base region and is closed by a separate cover.

17. Axle stub bearing unit for a bearing point of an axle stub of a steerable axle of a vehicle, comprising a radial bearing constructed as a needle bearing and a separate axial bearing constructed as a sliding bearing, wherein the bearings are accommodated in a cup-shaped bush, the bush is a one-part, formed component and a sleeve is located on the bush in a region of the axial bearing, and the sliding bearing is divided, comprising a first thrust washer supported in an axial direction on the bush and a sliding washer contacting the thrust washer and supported in the axial direction on the sleeve, wherein the thrust washer is made from a metal material and the sliding washer is made from a sliding material.

* * * * *